Nov. 17, 1925.  1,562,297
P. COVER
MILK AND CREAM SEPARATOR SPOUT
Filed May 1, 1925
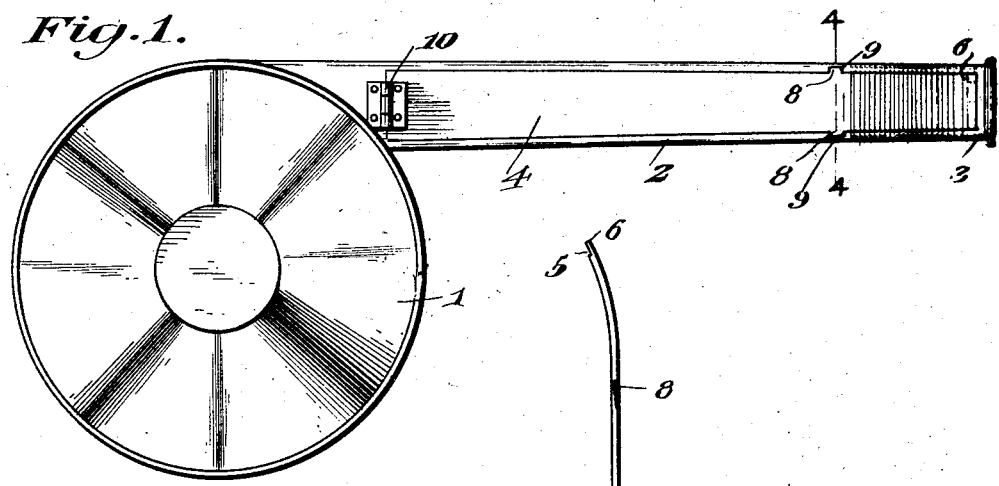
Fig. 1.
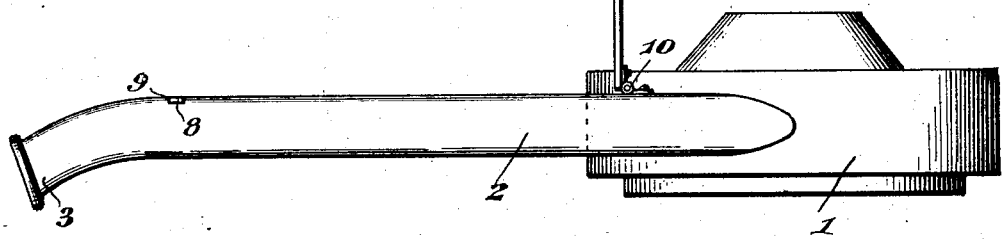
Fig. 2.
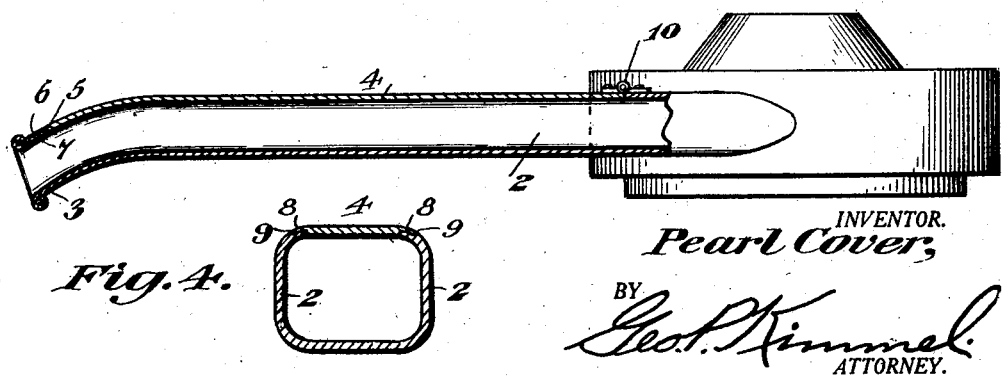
Fig. 3
Fig. 4.
INVENTOR.
Pearl Cover,
BY
Geo. F. Kimmel
ATTORNEY.

Patented Nov. 17, 1925.　　　　　　　　　　　　　　　　　　　　1,562,297

UNITED STATES PATENT OFFICE.

PEARL COVER, OF ANNA, ILLINOIS.

MILK AND CREAM SEPARATOR SPOUT.

Application filed May 1, 1925. Serial No. 27,324.

*To all whom it may concern:*

Be it known that I, PEARL COVER, a citizen of the United States, residing at Anna, in the county of Union and State of Illinois, have invented certain new and useful Improvements in Milk and Cream Separator Spouts, of which the following is a specification.

This invention relates to cream separators and has for its primary object the provision, in a manner as hereinafter set forth, of an improved type of discharge spout wherein means is provided for quicker and more thorough cleansing of the spout after the using of the separator.

It has been found that in the use of cream separators as at present constructed, the discharge spouts thereof are very difficult to keep thoroughly clean, and unless absolutely all of the cream has been removed therefrom after the using of the separator it will be readily seen that the same will become soured and unpleasant as well as unsanitary. It is the purpose of this invention to overcome this difficulty thru the provision of a spout which can be opened and thoroughly cleaned after use.

The invention contemplates the provision of a discharge spout having an elongated door in the top thereof which is designed to be opened up so that a cleaning brush or cloth can be passed over the inner surface of the spout from one end to the other to thoroughly remove from the surface any adhering bits of cream.

A further and final object of the invention is the provision, in a manner as hereinafter set forth, of a discharge spout of the usual design with the exception that a door is provided in the top thereof, and this spout is so constructed that the expense of manufacturing the same is negligible, particularly in view of the fact that through the use of the same the spout can be kept thoroughly clean and large quantities of cream or milk will be prevented from spoiling and becoming wasted.

The invention will be best understood from a consideration of the following detailed description taken in connection with the accompanying drawing forming a part of this specification, with the understanding that the invention is not confined to any strict conformity with the showing of the drawing, but may be changed and modified so long as such changes and modifications mark no material departure from the salient features of the invention, as expressed in the appended claim.

In the drawing:

Figure 1 is a top plan view of the discharge spout embodying this invention.

Figure 2 is a side elevation of the same showing the same with the top open.

Figure 3 is a central longitudinal section of the spout, and

Figure 4 is a transverse section taken upon the line 4—4 of Figure 1.

The invention comprises the usual milk or cream pan indicated generally by the numeral 1, which forms a part of the cream separator and tangentially from the side thereof extends the cream or discharge nozzle 2. These nozzles as shown are relatively broad and flat and are downturned as at 3, at their outer end.

The first top of the nozzle 2 has a longitudinally extending portion thereof cut out to provide the closure or door 4. The forward end of this door 4 is under cut as at 5 to provide the tongue 6 which overlaps a correspondingly cut portion 7 (Figure 3) of the nozzle or spout body.

The door 4 also has, at points adjacent its forward end, laterally extending ears 8, one on either side thereof and these ears seat in recesses or pockets 9 of the spout body.

At the rear end of the door 4 there is provided a hinge member 10, one leaf of which is secured to the door and the other secured to the top of the spout body as shown in Figures 1 and 3. It will be seen that due to the lip 6 and the ears 8, the door 4 when closed has its top flushed with the top of the spout 2 and thereby prevents dust or any other foreign matter from working thereunder and into the spout while the same is being used.

After the separator has been used and the operator desires to clean the discharge spout from which the cream and milk issues, the door 4 can be lifted to the position shown in Figure 2, and the interior of the spout thoroughly scoured and cleansed. In this manner the spout can be kept clean and sanitary at all times.

Having thus described my invention what I claim is:—

In a cream separator discharge spout, a spout body having a longitudinally extending slot therein, a door correspondingly shaped to the slot and snugly closing the same, a hinge connecting one end of the door to one end of the slot, the slot in opposite side edges being formed with notches, and lugs on opposite side edges of the door to engage the notches for holding the door relative to its inner and outer surfaces flush with corresponding surfaces of the spout.

In testimony whereof, I affix my signature hereto.

PEARL COVER.